US006679372B1

(12) United States Patent
Shaffer

(10) Patent No.: US 6,679,372 B1
(45) Date of Patent: Jan. 20, 2004

(54) QUARTER DISPLAYING AND TEACHING DEVICE

(76) Inventor: Roger D. Shaffer, 103 Debra La., Johnstown, PA (US) 15905

( * ) Notice: Subject to any disclaimer, the term of this patent is extended or adjusted under 35 U.S.C. 154(b) by 94 days.

(21) Appl. No.: 10/043,519

(22) Filed: Jan. 11, 2002

(51) Int. Cl.⁷ ............................................... B65D 85/00
(52) U.S. Cl. ...................... 206/0.84; 206/457; D99/34
(58) Field of Search .................. 206/0.8, 0.81–0.84, 206/445, 457; D99/34

(56) References Cited

U.S. PATENT DOCUMENTS

| 2,139,150 A | 12/1938 | Curtis et al. |
| 3,474,897 A | 10/1969 | Rambow |
| 3,913,732 A | 10/1975 | Peterson |
| 4,070,782 A | 1/1978 | Vasallo |
| 4,429,787 A | 2/1984 | Morse |
| D408,731 S | 4/1999 | Taylor et al. |
| D428,680 S * | 7/2000 | Hildebrand et al. .......... D99/34 |
| D430,381 S * | 8/2000 | Ellis et al. .................... D99/34 |
| D443,750 S * | 6/2001 | Reidenbach ................. D99/34 |
| D448,912 S * | 10/2001 | Galbraith, Jr. ............... D99/34 |
| D454,244 S * | 3/2002 | Scheff ......................... D99/34 |
| D456,979 S * | 5/2002 | Reidenbach ................. D99/34 |

* cited by examiner

Primary Examiner—Jim Foster

(57) ABSTRACT

A quarter displaying and teaching device for displaying commemorative Unites States quarters that depict the seals of the individual states. The quarter displaying and teaching device includes a panel having a front side and a peripheral edge. A plurality of indentations extends into the front side. Each of the indentations has a circular shape and has a diameter equal to a diameter of a quarter and adapted for removable receiving one of a plurality of quarters. The quarters are frictionally held in their respective indentations. A flag indicia is positioned on the front side. The flag indicia comprises a United States flag having fifty stars thereon. Each of the stars has one of the indentations therein.

4 Claims, 5 Drawing Sheets

QUARTER DISPLAYING AND TEACHING DEVICE

BACKGROUND OF THE INVENTION

1. Field of the Invention

The present invention relates to quarter storage and display devices and more particularly pertains to a new quarter displaying and teaching device for displaying commemorative Unites States quarters that depict the seals of the individual states.

2. Description of the Prior Art

The use of quarter storage and display devices is known in the prior art. More specifically, quarter storage and display devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,070,782; U.S. Pat. No. 3,474,897; U.S. Pat. No. 2,139,150; U.S. Des. Pat. No. 408,731; U.S. Pat. No. 4,429,787; and U.S. Pat. No. 3,913,732.

While these devices fulfill their respective, particular objectives and requirements, the aforementioned patents do not disclose a new quarter displaying and teaching device. The inventive device includes a panel having a front side and a peripheral edge. A plurality of indentations extends into the front side. Each of the indentations has a circular shape and has a diameter equal to a diameter of a quarter and adapted for removable receiving one of a plurality of quarters. The quarters are frictionally held in their respective indentations. A flag indicia is positioned on the front side. The flag indicia comprises a United States flag having fifty stars thereon. Each of the stars has one of the indentations therein.

In these respects, the quarter displaying and teaching device according to the present invention substantially departs from the conventional concepts and designs of the prior art, and in so doing provides an apparatus primarily developed for the purpose of displaying commemorative Unites States quarters that depict the seals of the individual states.

SUMMARY OF THE INVENTION

In view of the foregoing disadvantages inherent in the known types of quarter storage and display devices now present in the prior art, the present invention provides a new quarter displaying and teaching device construction wherein the same can be utilized for displaying commemorative Unites States quarters that depict the seals of the individual states.

The general purpose of the present invention, which will be described subsequently in greater detail, is to provide a new quarter displaying and teaching device apparatus and method which has many of the advantages of the quarter storage and display devices mentioned heretofore and many novel features that result in a new quarter displaying and teaching device which is not anticipated, rendered obvious, suggested, or even implied by any of the prior art quarter storage and display devices, either alone or in any combination thereof.

To attain this, the present invention generally comprises a panel having a front side and a peripheral edge. A plurality of indentations extends into the front side. Each of the indentations has a circular shape and has a diameter equal to a diameter of a quarter and adapted for removable receiving one of a plurality of quarters. The quarters are frictionally held in their respective indentations. A flag indicia is positioned on the front side. The flag indicia comprises a United States flag having fifty stars thereon. Each of the stars has one of the indentations therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new quarter displaying and teaching device apparatus and method which has many of the advantages of the quarter storage and display devices mentioned heretofore and many novel features that result in a new quarter displaying and teaching device which is not anticipated, rendered obvious, suggested, or even implied by any of the prior art quarter storage and display devices, either alone or in any combination thereof.

It is another object of the present invention to provide a new quarter displaying and teaching device which may be easily and efficiently manufactured and marketed.

It is a further object of the present invention to provide a new quarter displaying and teaching device which is of a durable and reliable construction.

An even further object of the present invention is to provide a new quarter displaying and teaching device which is susceptible of a low cost of manufacture with regard to both materials and labor, and which accordingly is then susceptible of low prices of sale to the consuming public, thereby making such quarter displaying and teaching device economically available to the buying public.

Still yet another object of the present invention is to provide a new quarter displaying and teaching device which provides in the apparatuses and methods of the prior art some of the advantages thereof, while simultaneously overcoming some of the disadvantages normally associated therewith.

Still another object of the present invention is to provide a new quarter displaying and teaching device for displaying commemorative Unites States quarters that depict the seals of the individual states.

Yet another object of the present invention is to provide a new quarter displaying and teaching device which includes a panel having a front side and a peripheral edge. A plurality of indentations extends into the front side. Each of the indentations has a circular shape and has a diameter equal to a diameter of a quarter and adapted for removable receiving one of a plurality of quarters. The quarters are frictionally held in their respective indentations. A flag indicia is positioned on the front side. The flag indicia comprises a United States flag having fifty stars thereon. Each of the stars has one of the indentations therein.

Still yet another object of the present invention is to provide a new quarter displaying and teaching device that holds the commemorative quarters while displaying, for teaching purposes, the evolution of the United States' flag.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
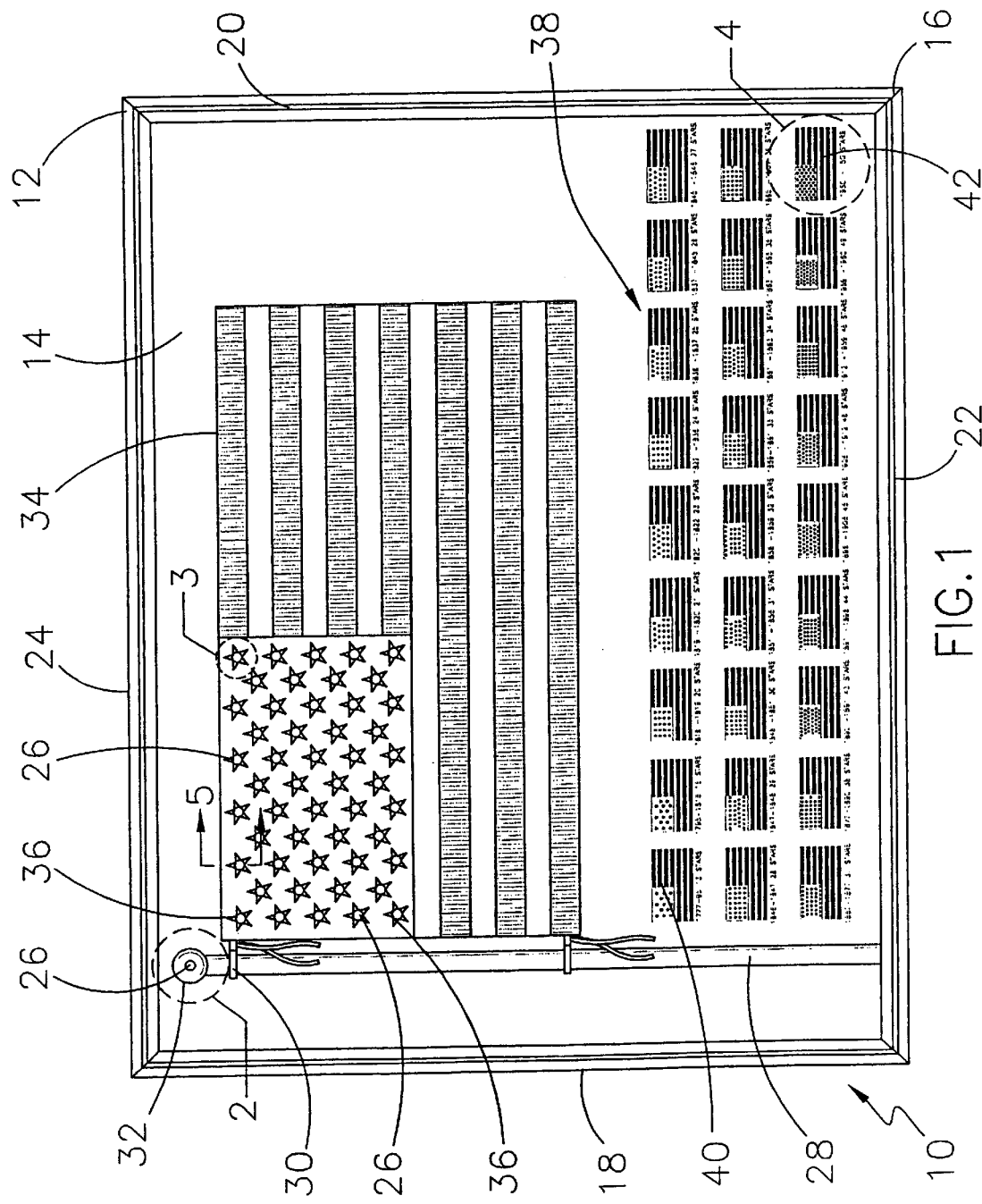
FIG. 1 is a schematic front view of a new quarter displaying and teaching device according to the present invention.
Figure 2:
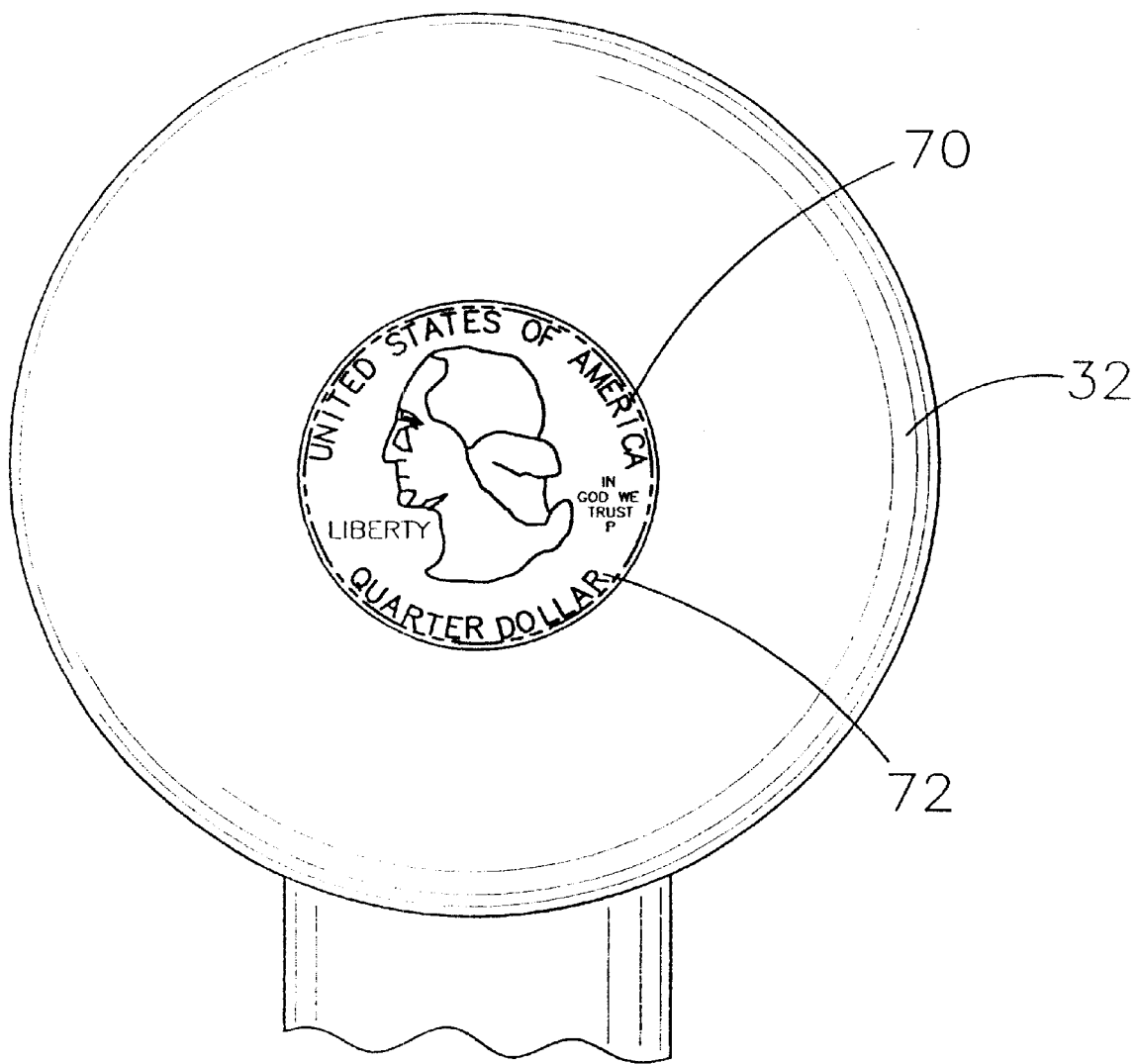
FIG. 2 is a schematic exploded view of the finial indicia of the present invention.
Figure 3:
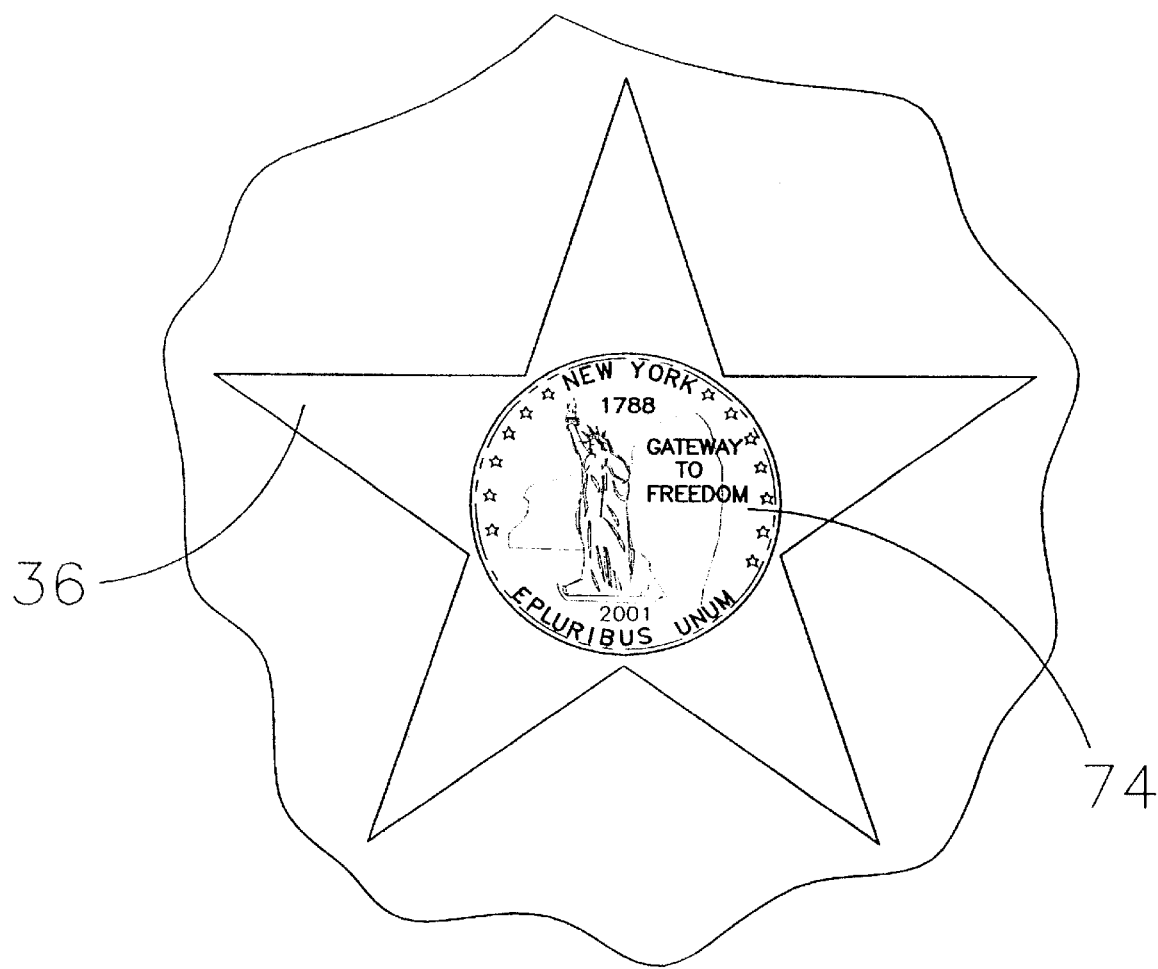
FIG. 3 is a schematic exploded view of a star of the present invention.
Figure 4:
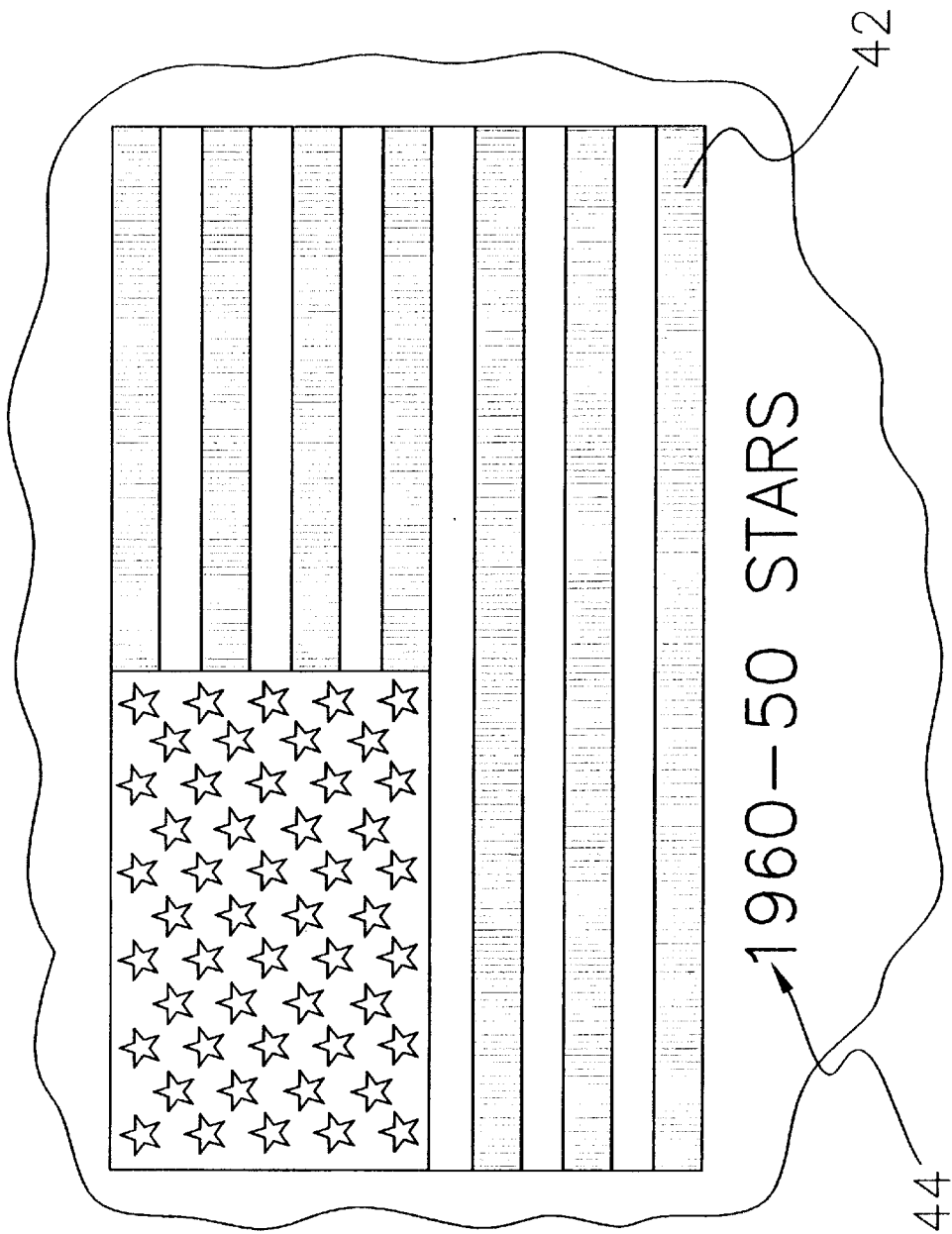
FIG. 4 is a schematic exploded view of historical flag indicia of the present invention.
Figure 5:
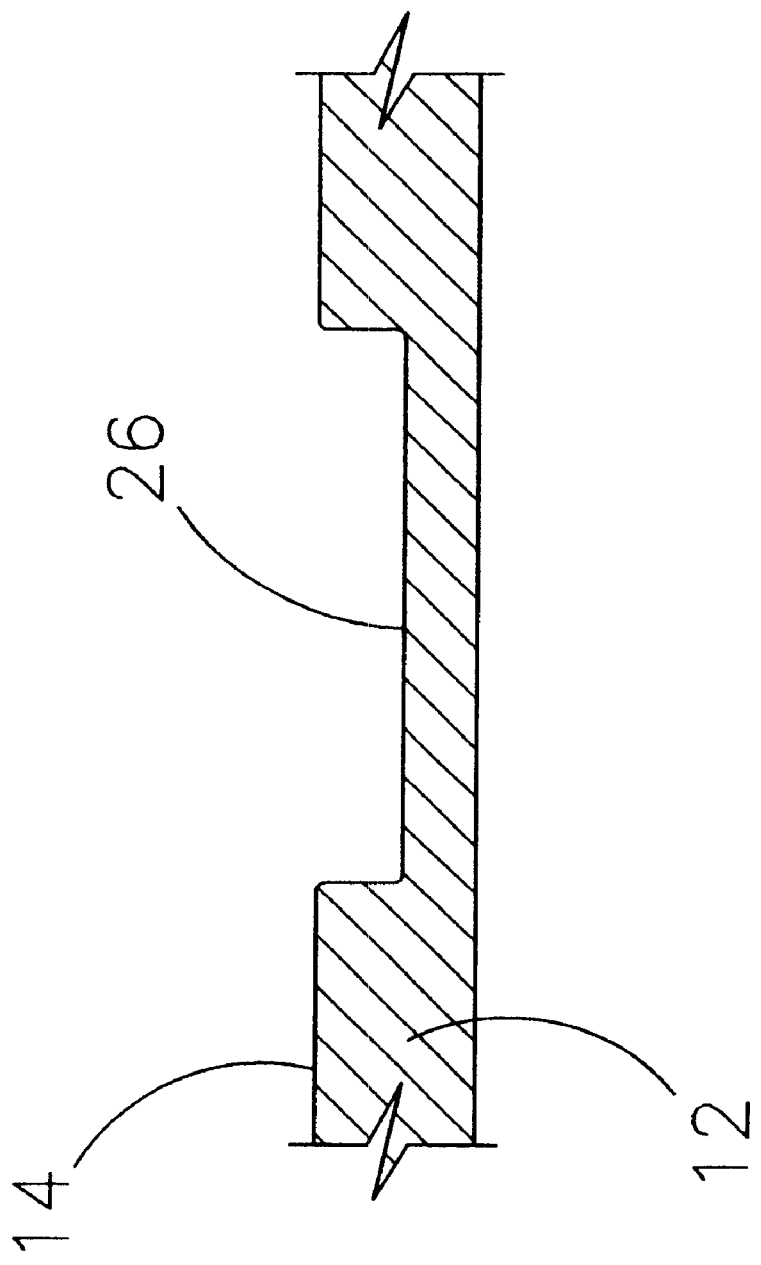
FIG. 5 is a schematic cross-sectional view taken along line 5—5 of FIG. 1 of the present invention.

With reference now to the drawings, and in particular to FIGS. 1 through 5 thereof, a new quarter displaying and teaching device embodying the principles and concepts of the present invention and generally designated by the reference numeral 10 will be described.

As best illustrated in FIGS. 1 through 5, the quarter displaying and teaching device 10 generally comprises a panel 12 having a front side 14 and a peripheral edge 16. The peripheral edge 16 generally has a rectangular shape and includes a first edge 18, a second edge 20, a third edge 22, and a fourth edge 24. The first 18 and second 20 edges are positioned opposite of each other.

A plurality of indentations 26 extends into the front side 14. Each of the indentations 26 has a circular shape and has a diameter equal to a diameter of a quarter 70 and is adapted for removably receiving one of a plurality of quarters 70. The quarters 70 are frictionally held in their respective indentations.

A flag pole indicia 28 is positioned on the front side 14 and is positioned generally adjacent to the first edge 18 such that the flag pole 28 extends from the third edge 22 toward the fourth edge 24. The flag pole 28 has an apex 30. A finial indicia 32 is positioned on the apex 30. One of the indentations 26 is positioned in the finial 32.

A flag indicia 34 is positioned on the front side 14. The flag indicia 14 comprises a United States flag having fifty stars 36 thereon. The flag indicia 34 extends from the flag pole 28 toward the second edge 20. The flag indicia 34 is positioned nearer the fourth edge 24 than the third edge 22. Each of the stars 36 has one of the indentations 26 therein.

A plurality of historical flag indicia 38 is positioned on the front side 14. The plurality of historical flag indicia 38 include 27 United States flags each having a different number of stars thereon representing an evolutionary step in a development of a 1960 United States flag having fifty stars thereon. A first of the historical flag indicia 40 has thirteen stars thereon and a last of the historical flag indicia 42 has fifty starts thereon. The historical flag indicia 38 are positioned between the flag indicia 34 and the third edge 22.

A plurality of date indicia 44 is positioned on the front side 14. Each of the date indicia 44 is positioned below and adjacent to one of the historical flag indicia 38 representative of the associated date indicia 44. The date indicia preferably include indicia indicating the number of stars on the United States flag during the time period indicated.

In use, each of the indentations 26 in the flag indicia 34 is used for receiving and storing one of the commemorative United States quarters 70 each depicting the state seal of each of the States of the United States. The front sides of the quarters 72 are placed face down into the indentations 26 to show the reverse sides 74 to depict the seals. The indentation in the finial 32 is used for showing the front 72, or head side, of a quarter 70. The historical flag indicia 38 represent the evolution of the modern, or 1960, United States flag having fifty stars. This gives the user of the device an opportunity to further comprehend and have an understanding of when each of the states entered the Union as they place the coins into their respective indentation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A display device for holding and displaying a plurality of United State's quarters, said device comprising:
   a panel having a front side and a peripheral edge;
   a plurality of indentations extending into said front side, each of said indentations having a circular shape and having a diameter equal to a diameter of a quarter and adapted for removable receiving one of the quarters, wherein the quarters are frictionally held in their respective indentations;
   a flag indicia being positioned on said front side, said flag indicia comprising a United States flag having fifty stars thereon, each of said stars having one of said indentations therein; and
   a flag pole indicia being positioned on said front side, said flag pole indicia having an apex, a finial indicia being positioned on said apex, one of said indentations being positioned in said finial, said flag indicia being adjacent to and extending away from said flag pole indicia.

2. A display device for holding and displaying a plurality of United State's quarters, said device comprising:
   a panel having a front side and a peripheral edge;
   a plurality of indentations extending into said front side, each of said indentations having a circular shape and having a diameter equal to a diameter of a quarter and adapted for removable receiving one of the quarters, wherein the quarters are frictionally held in their respective indentations;
   a flag indicia being positioned on said front side, said flag indicia comprising a United States flag having fifty stars thereon, each of said stars having one of said indentations therein; and
   a plurality of historical flag indicia being positioned on said front side, said plurality of historical flag indicia including 27 United States flags each having a different number of stars thereon representing an evolutionary step in a development of a 1960 United States flag having fifty stars thereon, a first of said historical flag indicia having thirteen stars thereon, a last of said historical flag indicia having fifty starts thereon.

3. The display device as in claim 2, further including a plurality of date indicia being positioned on said front side, each of said date indicia being positioned below and adjacent to one of said historical flag indicia representative of the associated date indicia.

4. A display device for holding and displaying a plurality of United State's quarters, said device comprising:
   a panel having a front side and a peripheral edge, said peripheral edge generally having a rectangular shape and including a first edge, a second edge, a third edge, and a fourth edge, said first and second edges being positioned opposite of each other;
   a plurality of indentations extending into said front side, each of said indentations having a circular shape and having a diameter equal to a diameter of a quarter and adapted for removable receiving one of the quarters, wherein the quarters are frictionally held in their respective indentations;
   a flag pole indicia being positioned on said front side and being positioned generally adjacent to said first edge such that said flag pole extends from said third edge toward said fourth edge, said flag pole indicia having an apex, a finial indicia being positioned on said apex, one of said indentations being positioned in said finial;
   a flag indicia being positioned on said front side, said flag indicia comprising a United States flag having fifty stars thereon, said flag indicia extending from said flag pole toward said second edge, said flag indicia being positioned nearer said fourth edge than said third edge, each of said stars having one of said indentations therein;
   a plurality of historical flag indicia being positioned on said front side, said plurality of historical flag indicia including 27 United States flags each having a different number of stars thereon representing an evolutionary step in a development of a 1960 United States flag having fifty stars thereon, a first of said historical flag indicia having thirteen stars thereon, a last of said historical flag indicia having fifty starts thereon, said historical flag indicia being positioned between said flag indicia and said third edge; and
   a plurality of date indicia being positioned on said front side, each of said date indicia being positioned below and adjacent to one of said historical flag indicia representative of the associated date indicia.

* * * * *